United States Patent
Lalgudi et al.

(10) Patent No.: US 11,375,714 B2
(45) Date of Patent: *Jul. 5, 2022

(54) ENCAPSULATION COMPOSITIONS

(71) Applicant: BATTELLE MEMORIAL INSTITUTE, Columbus, OH (US)

(72) Inventors: Ramanathan S. Lalgudi, Columbus, OH (US); Krenar Shqau, Columbus, OH (US)

(73) Assignee: BATTELLE MEMORIAL INSTITUTE, Columbus, OH (US)

( * ) Notice: Subject to any disclaimer, the term of this patent is extended or adjusted under 35 U.S.C. 154(b) by 159 days.

This patent is subject to a terminal disclaimer.

(21) Appl. No.: 16/091,610

(22) PCT Filed: Apr. 8, 2017

(86) PCT No.: PCT/US2017/026727
§ 371 (c)(1),
(2) Date: Oct. 5, 2018

(87) PCT Pub. No.: WO2017/177211
PCT Pub. Date: Oct. 12, 2017

(65) Prior Publication Data
US 2019/0150433 A1    May 23, 2019

Related U.S. Application Data

(60) Provisional application No. 62/335,987, filed on May 13, 2016, provisional application No. 62/319,907, filed on Apr. 8, 2016.

(51) Int. Cl.
*A01N 25/28* (2006.01)
*A01N 25/30* (2006.01)
(Continued)

(52) U.S. Cl.
CPC ............. *A01N 25/28* (2013.01); *A01N 25/04* (2013.01); *A01N 25/30* (2013.01); *A01N 43/38* (2013.01);
(Continued)

(58) Field of Classification Search
None
See application file for complete search history.

(56) References Cited

U.S. PATENT DOCUMENTS 4,290,903 A    9/1981  Macgilp et al.
5,019,392 A    5/1991  Wallach
(Continued)

FOREIGN PATENT DOCUMENTS

EP    2468092 A1    6/2012
WO    9706688        2/1997
(Continued)

OTHER PUBLICATIONS

Alonso, M.L., et al., Advantages of biocides: B-cyclodextrin inclusion complexes against active components for pesticide industry, International Journal of Enviromental Analytical Chemistry, 92:8, 963-978.

(Continued)

*Primary Examiner* — Dominic Lazaro
(74) *Attorney, Agent, or Firm* — Susanne A. Wilson; Frank Rosenberg

(57) ABSTRACT

An encapsulation composition is described. The composition comprises a plurality of capsules, each capsule comprising an amphiphilic material encapsulating a pyrethroid. The encapsulated pyrethroid has a release rate less than the release rate of the unencapsulated pyrethroid. Coated fabric products are also described.

20 Claims, 4 Drawing Sheets

(51) Int. Cl.
*A01N 25/04* (2006.01)
*A01N 53/00* (2006.01)
*D06M 13/236* (2006.01)
*D06M 23/12* (2006.01)
*C11D 3/39* (2006.01)
*C11D 3/395* (2006.01)
*C11D 17/00* (2006.01)
*A01N 43/38* (2006.01)
*C11D 3/37* (2006.01)

(52) U.S. Cl.
CPC ............ *A01N 53/00* (2013.01); *C11D 3/3796* (2013.01); *C11D 3/3935* (2013.01); *C11D 3/3951* (2013.01); *C11D 17/0039* (2013.01); *D06M 13/236* (2013.01); *D06M 23/12* (2013.01)

(56) References Cited

U.S. PATENT DOCUMENTS

| | | | |
|---|---|---|---|
| 5,037,653 A * | 8/1991 | Dawson | A01N 25/04 424/405 |
| 5,849,264 A | 12/1998 | Bassam et al. | |
| 6,277,404 B1 | 8/2001 | Laversanne et al. | |
| 2002/0136773 A1 | 9/2002 | Scher et al. | |
| 2007/0196410 A1 | 8/2007 | Jadhav et al. | |
| 2011/0053825 A1 | 3/2011 | Lalgudi | |
| 2011/0217255 A1 * | 9/2011 | Kim | C08L 67/00 424/70.11 |
| 2011/0223206 A1 | 9/2011 | Lebouille et al. | |
| 2016/0024441 A1 | 1/2016 | Cosgrove et al. | |

FOREIGN PATENT DOCUMENTS

| | | | |
|---|---|---|---|
| WO | 03051116 A1 | 6/2003 | |
| WO | WO-03051116 A1 * | 6/2003 | ............ A01N 53/00 |
| WO | WO-2007036710 A2 * | 4/2007 | ............ D06M 16/00 |
| WO | 2007081961 A2 | 7/2007 | |
| WO | 2013005009 A1 | 1/2013 | |
| WO | 2013105107 A2 | 7/2013 | |
| WO | 2015127051 A1 | 8/2015 | |

OTHER PUBLICATIONS

Yang, Ji Sheng, et al., Synthesis of Amidic Alginate Derivatives and Their Application in Microencapsulation of X-cyhalothrin, Biomacromolecules 2011, 12, 2982-2987.

International Search Report for International application No. PCT/US2017/026727, dated Jun. 30, 2017.

International Search report for international application No. PCT/US2017/026726, dated Jul. 20, 2017.

Kumar, Ashok, Smart Polymeric Biomaterials: where Chemistry & Biology can merge. Available at: <http://www.iitk.ac.in/directions/dirnet7/PP~ASHOK~FFF .pdf> Acessed on: 02 out. 2011.

Joshi, Rucha, Smart Microspheres for Stimuli Responsive Drug Delivery, submitted to Faculty of Graduate School of Vanderbilt University, Nashville, Tennessee, Dec. 2011.

Peteu, Serban F., et al., Responsive Polymers for Crop Protection, www.mdpi.com/journal/polymers, Aug. 2010.

Ghizal, Rushi, et al., Smart Polymers and Their Applications, International Journal of Engineering Technology, Management and Applied Sciences, Sep. 2014, vol. 4, Issue 4.

Narayan, Ramani, Biodegradable Plastics, Michigan Biotechnology Institute and Michigan State University, 1993, Michigan.

Aguilar, M.R., Smart Polymers and Their Applications as Biomaterials, Topics in Tissue Engineering, vol. 3, 2007.

Written Opinion of International Searching Authority for corresponding PCT/US2017/026727, dated Oct. 9, 2018.

Written Opinion of International Searching Authority for corresponding PCT/US2017/026726, dated Oct. 9, 2018.

1st Office Action in European Application EP17718699.6 dated May 11, 2021.

* cited by examiner

ENCAPSULATION COMPOSITIONS

This application is a U.S. National Phase under 35 U.S.C. § 371 of International Application No. PCT/US2017/26727, filed Apr. 8, 2017, which claims the benefit of U.S. Provisional Application No. 62/335,987 which was filed May 13, 2016, and U.S. Provisional Application No. 62/319,907 which was filed Apr. 8, 2016, and the contents of which are hereby incorporated by reference in their entirety.

STATEMENT OF GOVERNMENT RIGHTS

This invention was made with government support under Contract Number W81XWH-14-C-0005 awarded by the US Army Medical Research and Materiel Command. The government has certain rights in the invention.

BACKGROUND OF THE INVENTION

This invention relates in general to encapsulation materials and methods, and in particular to pyrethroids encapsulated by amphiphilic materials.

The practice of protecting pyrethroids from an incompatible environment by encapsulation is well known. Encapsulation may be employed for a variety of reasons, including protecting pyrethroids from oxidation, preventing volatile losses, preventing chemical reaction or improving the handling characteristics of pyrethroids. The protective coating or shell is ruptured at the time of desired action of the ingredient. The rupturing of the protective shell is typically brought about through the application of chemical or physical stimuli such as pressure, shear, melting, response solvent action, enzyme attack, chemical reaction or physical disintegration.

A number of companies have worked on improvements in encapsulation materials, including Revolymer Limited (U.K.) as disclosed in their published international patent applications WO 2009/050203, WO 2011/064555, WO 2012/140442 and WO 2014/140550 A1; and Novozymes A/S (Denmark) as disclosed in WO 2016/023685.

There is still a need for further improvements in encapsulation materials, particularly in regards to the releasable encapsulation of pyrethroids.

DESCRIPTION OF THE INVENTION

Figure 1:
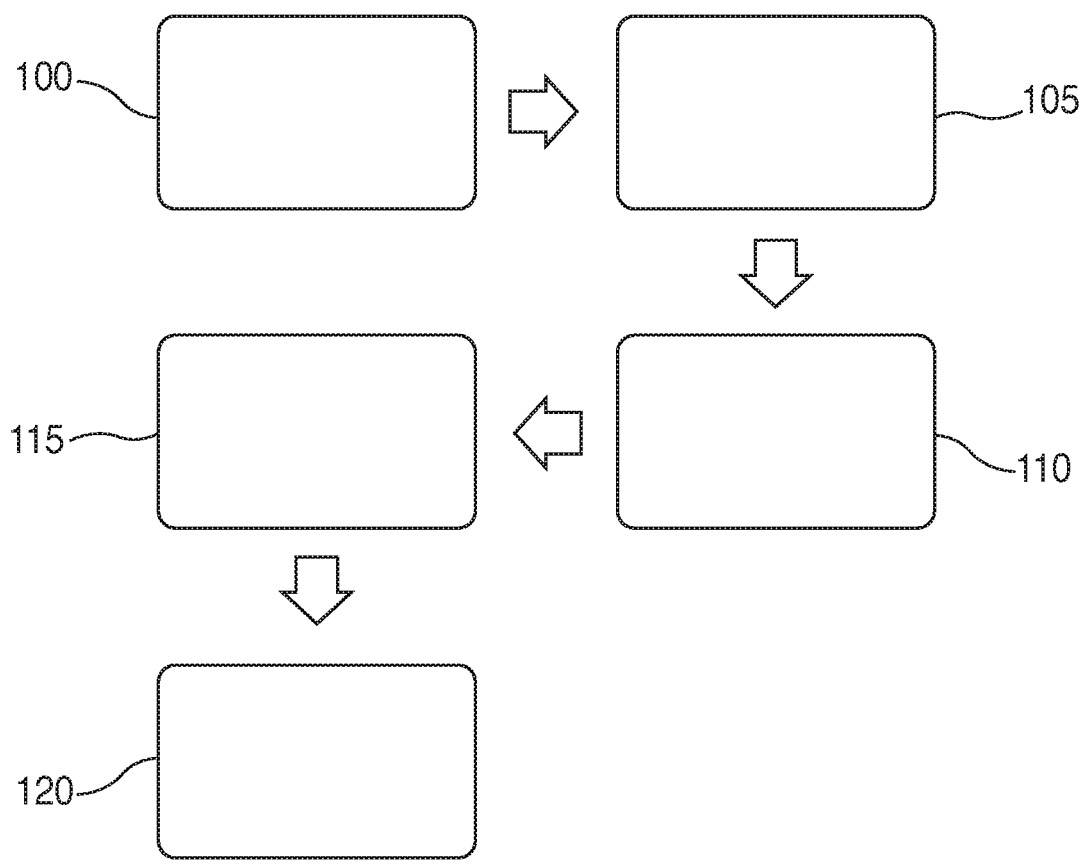
FIG. 1 is a flow chart of one embodiment of the encapsulation of a pyrethroid with a copolymer.

The present invention relates to an encapsulation composition comprising a plurality of capsules, each capsule comprising an amphiphilic material encapsulating a pyrethroid. The pyrethroid has a release rate less than a release rate of the unencapsulated pyrethroid.

In a particular embodiment, the encapsulating materials have well-balanced hydrophilic and hydrophobic chemical moieties that are useful for encapsulating pyrethroid.

The addition of materials with well-balanced hydrophilic and hydrophobic moieties to a pyrethroid results in the encapsulation of the pyrethroid via association of the amphiphilic materials onto the pyrethroid. The association of the material onto the pyrethroid may be driven by one or a combination of noncovalent forces such as dipole, hydrogen bonding, van der Waals, electrostatic, cation-pi electron interaction, or hydrophobic effects.

The amphiphilic material is a material composed of hydrophilic and hydrophobic portions or parts, which in certain embodiments are hydrophilic and hydrophobic sections or blocks. In certain embodiments involving block copolymers or surfactants useful for forming micelles, the amphiphilic material has a hydrophilic-lipophilic balance (HLB) within a range of from about 1 to about 20, or from about 11 to about 20, or from about 14 to about 18.

The hydrophilic portion anchors the encapsulated pyrethroid, and the hydrophobic portion forms a shell wall of the capsule.

In certain embodiments, the amphiphilic material is a polymer, and more particularly, a copolymer such as a graft copolymer or a block copolymer.

In some non-limiting examples, the amphiphilic material may be included in one or more of the following classes of materials: a graft copolymer, a modified N,N,N',N'-Tetrakis (2-hydroxypropyl)ethylenediamine, a cationic nanoparticle, a diblock or triblock copolymer, an ionic or nonionic surfactant, a low surface energy silica, a Guerbet ester, or a poly(stearyl methacrylate-co-acrylic acid).

For example, the amphiphilic material may be one or more of the following:

- a non-ionic graft copolymer, such as poly(laurylmethacrylate)-g-polyethylene oxide (PLMA-g-PEG) (50:50, 75:25) or hydrophobically modified starch;
- a material prepared by modification of N,N,N',N'-Tetrakis (2-hydroxypropyl)ethylenediamine with trimethyl silyl chloride, with epoxy, or with a fluorinated epoxy mixture of poly(dimethyl siloxane)-amine (PDMS-amine) with fluoro trichlorosilane 1% siloxane/N-alkyl emulsion;
- a material prepared by modification of epoxy functional terminated polyethylene oxide, with amine functional terminated poly(dimethyl siloxane) (PDMS-PEO-PDMS)
- a cationic nanoparticle, such as a cationic nanoparticle prepared as described in the U.S. Pat. No. 9,000,203 by a sol-gel condensation of 3-aminopropyl trimethoxy silane and tridecafluoro-1,1,2,2-tetrahydrooctyl triethoxysilane.
- a cationic nanoparticle, such as a cationic nanoparticle prepared as described in the U.S. Pat. No. 9,000,203 by a sol-gel condensation of 3-aminopropyl trimethoxy silane and a non-bioaccumulating fluorosilane such as trimethoxy(3,3,3-trifluoropropyl)silane
- a non-ionic triblock polymer obtained by reacting monomethoxy terminated poly ethylene oxide with heptadecane dicarboxylic acid methyl ester such as C19 di-PEG;
- a non-ionic triblock polymer obtained by reacting monohydroxyl terminated poly ethylene oxide with heptadecane dicarboxylic acid such as C19 di-PEG a heptadecane carboxylic acid ester salts such as C19 di-acid salts with, Na+, K+, or Ca 2+ ions;

a tert-octyl phenol derivative of sulfonated dichloro diphenyl sulfone, such as

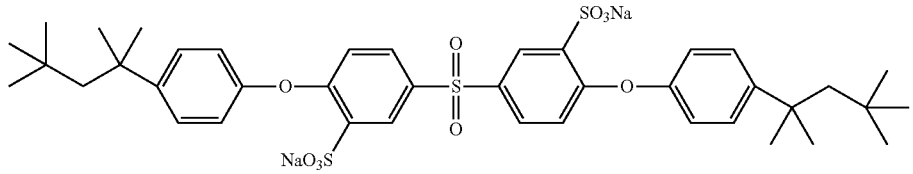

or a nonyl phenol derivative of sulfonated dichloro diphenyl sulfone, or a poly(dimethyl siloxane) derivative of sulfonated dichloro diphenyl sulfone;

a low surface energy nonionic surfactant, such as isostearic acid-g-PEG;

a low surface energy graft copolymer, such as isostearic acid PEG triblock ester or isostearic acid-ester-co-PEG-methacrylate;

a low surface energy silica, such as isostearic acid ester silica;

a Guerbet ester, such as a highly branched tri-isostearic acid citrate ester;

a poly(stearyl methacrylate co acrylic acid), such as poly(stearyl methacrylate)-co-acrylic acid (PSMA-co-AA) 80:20;

a poly(stearyl methacrylate co N,N'-dimethylamino ethyl methacrylate, NN-DMEA), such as poly(stearyl methacrylate)-co-NN-DMEA (PSMA-co-PNNDMEA) 50:50;

a non-ionic diblock copolymer prepared by reacting mono hydroxy polyethylene oxide with 1-bromo octadecane;

a nonionic triblock copolymer prepared by reacting di hydroxy polyethylene oxide with 1-bromo octadecane;

a non-ionic diblock copolymer prepared by reacting mono hydroxy polyethylene oxide with linolenic acid; or a non-ionic diblock copolymer prepared by reacting mono hydroxy polyethylene oxide with linoleic acid.

By cationic non-bio accumulating fluoropolymer, we mean a fluoropolymer with less than a 6 fluorocarbon chain. By low surface energy, we mean the surface energy is less than about 20 dynes/cm.

The encapsulated pyrethroid can be liquid, or solid, or combinations thereof. Some non-limiting examples of pyrethroids are allethrin, permethrin, transfluthrin, tefluthrin, metofluthrin, fenfluthrin, kadethrin, neopynamins, prallethrin, vapothrin, esbiothrin, dichlovos, deltamethrin, and cypermethrin.

The pyrethroid may be encapsulated by the amphiphilic material by any suitable method. Some encapsulation techniques include, but are not limited to, dispersion, suspension, emulsification, and coating via conventional and electrostatic spray.

When the pyrethroid is a solid or a liquid, it can be mixed in a solution of the amphiphilic material. The amphiphilic material forms a coating around the solid or liquid particles. In some cases, the pyrethroid can be dissolved in a solvent (such as water, methanol, ethanol, isopropyl alcohol, hexane, nonane, dodecane, toluene, xylene, N-methyl-2-pyrrolidone, dimethyl formamide, and dimethyl acetamide) before being mixed into the solution of amphiphilic material. The solvent used to dissolve the amphiphilic material should be immiscible with the solvent used to dissolve the active ingredient. For example, if the pyrethroid to be encapsulated is soluble in an organic solvent (e.g., transfluthrin), then water is used to dissolve the amphiphilic material, and organic solvent to dissolve the pyrethroid.

Solid or liquid pyrethroids should be sparingly soluble in the liquid used for the solution of the amphiphilic material. By sparingly soluble, we mean the solubility of the solute is less than about 3 g in 100 ml of the liquid. The capsules can be nanocapsules and/or microcapsules. The capsules are typically in the range of about 10 nm to about 500 m, or about 0.1 m to about 100 m, or about 1 m to about 50 m.

In some embodiments, the capsules are stable at alkaline pH.

In addition to the amphiphilic material, an additional surfactant (or co-surfactant) can be added to the mixture. Examples of co-surfactants include, but are not limited to, Sodium dodecyl sulfate, Sodium dodecylbenzenesulfonate, Sodium laureth sulfate, Sodium lauroyl sarcosinate, Sodium myreth sulfate, Sodium nonanoyloxybenzenesulfonate, Sodium stearate, Sulfolipid, Benzalkonium chloride, Benzyldodecyldimethylammonium bromide, Cetylpyridinium chloride, Dimethyldioctadecylammonium bromide, Dodecyltrimethylammonium bromide, Hexadecylpyridinium chloride, Tridodecylmethylammonium chloride FIG. 1 is a flow chart of the encapsulation of a pyrethroid with an amphiphilic material. In step 100, the pyrethroid, such as TAED, is suspended in a solvent, such as hexane. In step 105, amphiphilic material is added. In step 110, in some cases, the amphiphilic material forms micelles. In step 115, if micelles are formed, the micelles are deposited onto the pyrethroid with the amphiphilic material. Otherwise, the amphiphilic material encapsulates the pyrethroid without forming micelles. The product can then be isolated in step 120.

In certain embodiments, the amphiphilic material is an amphiphilic polymer capable of forming a micelle around the pyrethroid when the capsule is dispersed in a liquid.

Micelles form only when the concentration of the polymer is greater than the critical micelle concentration (CMC). In certain embodiments, capsules have a CMC within a range of from about 0.0001 wt % to about 50 wt %. In addition, micelles only form when the temperature is above the critical micelle temperature (CMT) (also known as the cloud point or Krafft temperature). The CMT depends on a number of factors including the molecular weight of the polymer, the ratio of the hydrophobic portion to the hydrophilic portion, and functionality of the hydrophilic moiety. In general, the higher the amount of the hydrophobic portion, the higher the critical micelle temperature.

In general, block copolymers having a number average molecular weight less than 100,000 kD will form micelles. Examples of amphiphilic polymers forming micelles include, but are not limited to, PEO-PPO-PEO, PEO-PPO, PDMS-PEO-PDMS, PDMS-PEO, C19-diPEG, diblock copolymer prepared by reacting mono hydroxy polyethylene oxide with 1-bromo octadecane, nonionic triblock copolymer prepared by reacting di hydroxy polyethylene oxide with 1-bromo octadecane, C19 dicarboxylic acid salts, tert-octyl phenol derivative of sulfonated dichloro diphenyl sulfone, nonyl phenol derivative of sulfonated dichloro diphenyl sulfone, and poly(dimethyl siloxane) derivative of sulfonated dichloro diphenyl sulfone.

Figure 2:
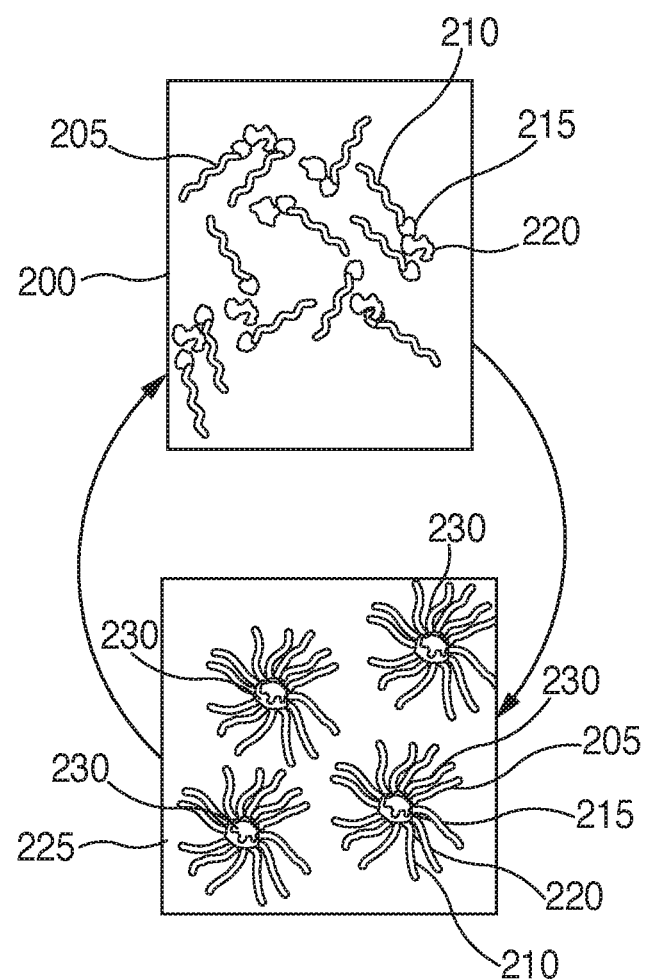
FIG. 2 is a schematic representation of a pyrethroid being encapsulated in polymer micelles.

FIG. 2 is a schematic representation of the encapsulation of a pyrethroid in amphiphilic micelles. As shown, in the first step 200, an amphiphilic material 205 is dispersed in a solvent, such as water. The amphiphilic material 205 has a hydrophilic segment 210 and a hydrophobic segment 215. The hydrophobic segment 215 of the amphiphilic material is adsorbed onto the pyrethroid 220.

Above the CMC and CMT of the amphiphilic material 205 as shown in the second step 225, the amphiphilic material 205 forms micelles 230 around the pyrethroid 220. The pyrethroid 220 is encapsulated inside a hydrophobic core of the micelle 230 formed by the hydrophobic segment 215 of the amphiphilic material 205. The hydrophilic segment 210 of the amphiphilic material 205 extends radially outward and forms the shell of the micelle 230.

Figure 6:
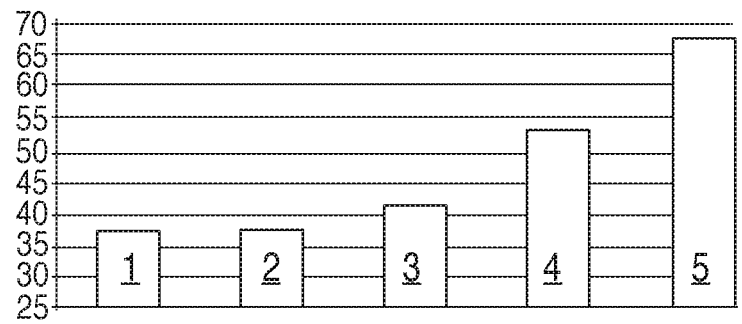
FIG. 6 is a bar graph showing the results of a micellar disintegration study.

FIG. 6 illustrates the disintegration of micelles by dilution with water in graphical form. The amphiphilic material was a non-ionic diblock copolymer prepared by reacting mono hydroxy polyethylene oxide with 1-bromo octadecane. When the copolymer was dissolved in water at a concentration of 0.01 wt %, the surface tension of the water was 37.5 dynes/cm (bar 1). When the copolymer was dissolved in water at a concentration of 0.0035 wt % and exposed to 9.5 pH aqueous solution, the surface tension of the water was 38.1 dynes/cm (bar 2). When the copolymer was dissolved in water at a concentration of 0.0035 wt % the surface tension of the water was 42.1 dynes/cm (bar 3). When the copolymer was dissolved in water at a concentration of 0.006 wt % and exposed to 9.5 pH aqueous solution, the surface tension of the water was 54.1 dynes/cm (bar 4). For reference purposes, the surface tension of water is 70 dynes/cm. When more water was added to the micelles, the surface tension increased and approached the value of water, which suggests that the non-ionic diblock copolymer prepared by reacting mono hydroxy polyethylene oxide with 1-bromo octadecane disintegrates on dilution.

When the pyrethroid is transfluthrin, a preferred amphiphilic material is PEO-PPO-PEO.

Figure 3:
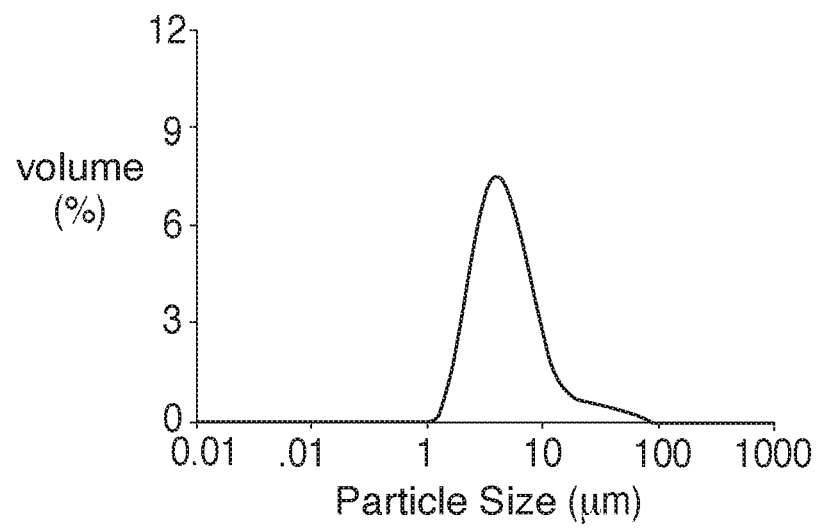
FIG. 3 is a graph of the particle size distribution of an encapsulation composition according to the invention, which is made as described in Example 2.

The encapsulated product is coated on a fabric. The coating can be accomplished using any suitable coating process including, but not limited to, immersion, spraying, knife coating, direct roll coating, pad-dry coating, calender coating, hot melt extrusion coating, foam finishing, and gravure printing.

The fabric can be derived from polymeric fibers such as polyester, polyamide, polyester amide, polyimide, poly ester imide, polybenzimidazole, polybenzoxazole, polythiazole, polydimethyl siloxane-polyether amide copolymer, and the blends thereof. The fibers can be derived from natural materials such as cotton, soybeans, corn, sorghum, sugarcane, coconut, animal proteins and sea weed.

One or more additional ingredients useful for formulating the product can be included. Additional ingredients include, but are not limited to, thickening agents (e.g., polyvinyl alcohol, poly vinyl pyrrolidone, and carboxyl methyl cellulose), and co-solvents (e.g., glycerol, and 1,2-propylene glycol).

The release rate of active ingredient from the encapsulation composition of the present invention was determined by gravimetric analysis. A fabric (1 sq. inch) was coated with the encapsulation composition and dried at room temperature to remove excess water and toluene. The coated fabric was kept under a controlled atmosphere (70 degree F. and 68% relative humidity), and its weight was monitored and recorded as a function of time. The release rate was calculated using the following equation:

$$K = -\frac{\Delta m}{\Delta t}$$

Where, K is the release rate, Δm is difference in mass and Δt is the difference in time.

EXAMPLES

Example 1

Screening of Amphiphilic Materials for Encapsulation:

In the first step, the amphiphilic material is dissolved in water. The amphiphilic materials were commercially available products (Pluronic®) from BASF, asn shown below.

In the second step, the pyrethroid, transfluthrin, was dissolved in a large amount in toluene.

In the third step, the mixture obtained from second step was added to the mixture obtained from first step to form the pyrethroid encapsulated in the amphiphilic material.

The release rate of the pyrethroid from the capsules is controlled by a number of factors. One is the amount of amphiphilic material used in step 1. Higher amounts of amphiphilic material in step 1 result in decreased release rates of the pyrethroid. The release rate of the pyrethroid from the capsules is further controlled by the CMC of the amphiphilic material used in step 1. The higher the CMC of the amphiphilic material in step 1, the lower the release rate of the pyrethroid. The release rate of the pyrethroid from the capsules is further controlled by the ratio of organic solvents to the pyrethroid in step 2. The higher the ratio of organic solvents to the pyrethroid in step 2, the lower the release rate of the pyrethroid.

| Copolymer | MW | No. of PO | No. of EO | HLB | CMC (wt %) |
|---|---|---|---|---|---|
| L35 | 1900 | 16.38 | 21.59 | 19 | 1.0 |
| L43 | 1850 | 22.33 | 12.61 | 12 | 0.4 |
| L64 | 2900 | 30.00 | 26.36 | 15 | 0.14 |

Example 2

In the first step, an aqueous solution of 5.6 wt % poly (ethylene oxide)-block-poly(propylene oxide)-block-poly (ethylene oxide) (PEO-PPO-PEO) (Pluronic® L64 (BASF)) was prepared by mixing 23.7 g of the block co-polymer in 400 g water. The solution was mixed for 3 hr using a magnetic stirrer at 300 rpm.

In the second step, 11.3 g of transfluthrin (TF) was dissolved in 15.8 g of toluene.

In the third step, the mixture obtained from the second step was added to the mixture obtained from the first step at room temperature to form the pyrethroid encapsulated in the amphiphilic material.

The product obtained from third step was characterized for particle size using dynamic-light-scattering (DLS, Master sizer 2000, Malvern). Formation of 3 µm droplet size with uniform drop-size-distribution was observed, as shown in FIG. 3.

The release rate of the transfluthrin as determined by the gravimetric method was found to be ≤0.2 mg/day.

Example 3

In the first step, an aqueous solution of 5.7 wt % poly (ethylene oxide)-block-poly(propylene oxide)-block-poly (ethylene oxide) (PEO-PPO-PEO) (Pluronic® L64 (BASF)) was prepared by mixing 24.1 g of the block co-polymer in 400 g water. The solution was mixed for 3 hr using a magnetic stirrer at 300 rpm.

In the second step, 13.48 g of transfluthrin (TF) was dissolved in 74.8 g of toluene.

In the third step, the mixture obtained from the second step was added to the mixture obtained from the first step at room temperature to form the pyrethroid encapsulated in the amphiphilic material.

Figure 4:
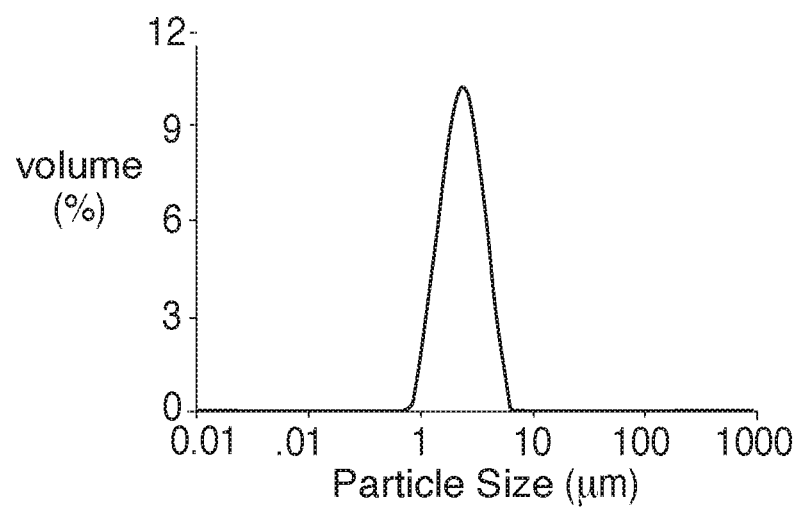
FIG. 4 is a graph of the particle size distribution of another embodiment of a encapsulation composition according to the invention, which is made as described in Example 3.

The product obtained from third step was characterized for particle size using dynamic-light-scattering (DLS, Master sizer 2000, Malvern). Formation of 3 µm droplet size with uniform drop-size-distribution was observed, as shown in FIG. 4.

The release rate of the transfluthrin as determined by the gravimetric method was found to be ≤0.4 mg/day.

Example 4

In the first step, an aqueous solution of 7.1 wt % poly (ethylene oxide)-block-poly(propylene oxide)-block-poly (ethylene oxide) (PEO-PPO-PEO) (Pluronic® L64 (BASF)) was prepared by mixing 30.8 g of the block co-polymer in 400 g water. The solution was mixed for 3 hr using a magnetic stirrer at 300 rpm.

In the second step, 18.48 g of transfluthrin (TF) was dissolved in 289.8 g of toluene.

In the third step, the mixture obtained from the second step is added to the mixture obtained from the first step at room temperature to form the pyrethroid encapsulated in the amphiphilic material.

Figure 5:
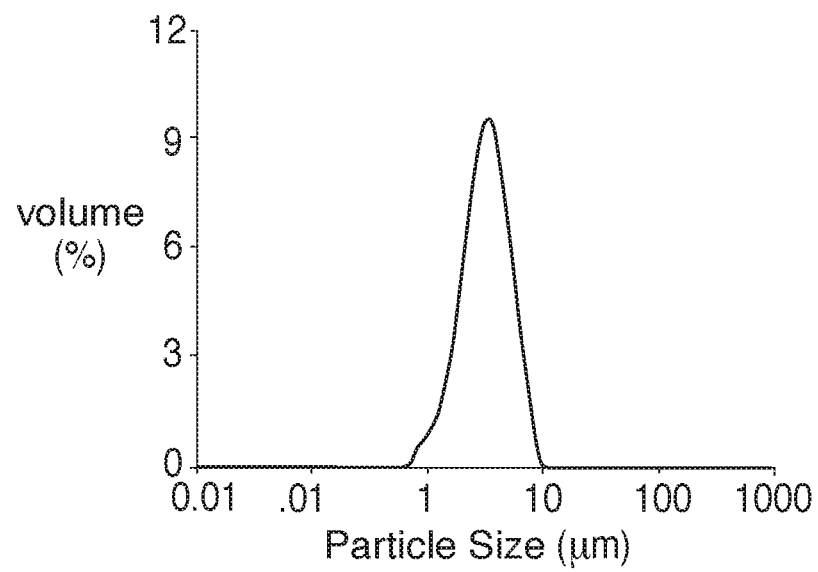
FIG. 5 is a graph of the particle size distribution of a further embodiment of a encapsulation composition according to the invention, which is made as described in Example 4.

The product obtained from third step, was characterized for particle size using dynamic-light-scattering (DLS, Master sizer 2000, Malvern). Formation of 3 µm droplet size with uniform drop-size-distribution was observed, as shown in FIG. 5.

The release rate of the transfluthrin as determined by the gravimetric method was found to be ≤0.6 mg/day.

By about, we mean within 10% of the value, or within 5%, or within 1%.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

The invention claimed is:

1. An encapsulated composition comprising:
a plurality of capsules each comprising an amphiphilic material encapsulating a pyrethroid, the amphiphilic material forming micelles around the pyrethroid, wherein the amphiphilic material has hydrophilic and hydrophobic portions, and wherein the hydrophilic portion anchors the encapsulated pyrethroid and the hydrophobic portion forms a shell wall of the capsule, the encapsulated pyrethroid having a release rate less than a release rate of unencapsulated pyrethroid; wherein the capsules have a particle size of about 0.8 µm to about 10 µm.

2. The composition of claim 1 wherein the pyrethroid is at least one of allethrin, permethrin, transfluthrin, tefluthrin, metofluthrin, fenfluthrin, kadethrin, neopynamins, prallethrin, vapothrin, esbiothrin, dichlovos, deltamethrin, and cypermethlin.

3. The composition of claim 1 wherein the amphiphilic material is a polymer.

4. The composition of claim 3 wherein the polymer is a copolymer.

5. The composition of claim 1 wherein the amphiphilic material is a graft copolymer, a modified N,N,N',N'-Tetrakis (2-hydroxypropyl)ethylenediamine, a cationic nanoparticle, a diblock copolymer, a triblock copolymer, an ionic surfactant, a nonionic surfactant, a low surface energy silica, a Guerbet ester, or a poly(stearyl methacrylate-co-acrylic acid).

6. The composition of claim 1 wherein the amphiphilic material has a hydrophilic-lipophilic balance within a range of from about 1 to about 20.

7. The composition of claim 1 wherein the capsules are stable at alkaline pH.

8. The composition of claim 1 wherein the amphiphilic material is at least one of a diblock copolymer, a triblock copolymer, and a nonionic surfactant.

9. The composition of claim 1 wherein the amphiphilic material is an amphiphilic polymer.

10. The composition of claim 8 wherein the amphiphilic material has a critical micelle concentration within a range of from about 0.0001 wt % to about 50 wt % and wherein the capsules have a particle size of about 0.9 µm to about 8 µm.

11. The composition of claim 1 wherein the pyrethroid is transfluthrin.

12. The composition of claim 1 wherein the amphiphilic material is a poly(ethylene oxide)-poly(propylene oxide)-poly(ethylene oxide) triblock copolymer.

13. The composition of claim 1, wherein the pyrethroid is at least one of allethrin, permethrin, transfluthrin, tefluthrin, metofluthrin, fenfluthrin, kadethrin, neopynamins, prallethrin, vapothrin, esbiothrin, dichlovos, deltamethrin, and cypermethrin.

14. A product comprising:
the composition of claim 1 coated on a fabric.

15. The product of claim 14 further comprising one or more additional ingredients useful for formulating the product wherein the pyrethroid is transfluthrin encapsulated in a PEO-PPO-PEO block coplymer.

16. An encapsulated composition coated on a fabric comprising:
a plurality of capsules having a particle size of about 0.8 µm to about 10 µm each comprising an amphiphilic material encapsulating a pyrethroid, the amphiphilic material forming micelles around the pyrethroid, wherein the amphiphilic material has hydrophilic and hydrophobic portions, and wherein the hydrophilic portion anchors the encapsulated pyrethroid and the hydrophobic portion forms a shell wall of the capsule, and wherein the amphiphilic material is a graft copolymer, a modified N,N,N',N'-Tetrakis(2-hydroxypropyl)ethylenediamine, a cationic nanoparticle, a diblock copolymer, a triblock copolymer, an ionic surfactant, a nonionic surfactant, a low surface energy silica, a Guerbet ester, or a poly(steatyl methacrylate-co-acrylic acid), wherein the composition is coated on a fabric wherein the fabric is derived from polymeric fibers or natural material;

wherein the encapsulated pyrethroid having a release rate less than a release rate of unencapsulated pyrethroid and wherein the release rate of the encapsulated pyrethroid is such that, when the pyrethroid is coated on 1 square inch of the fabric and kept at 70° F. and 68% relative humidity, the release rate of pyrethroid is less than or equal to 6 mg/day;

wherein the amphiphilic material has a hydrophilic-lipophilic balance within a range of from about 1 to about 20.

17. The encapsulated composition coated on a fabric of claim 16 wherein the amphiphilic material has a critical micelle concentration within a range of from about 0.0001 wt % to about 50 wt % and wherein the amphiphilic material has a hydrophilic-lipophilic balance within a range of from about 1 to about 20.

18. The encapsulated composition coated on a fabric of claim 16 wherein the pyrethroid is transfluthrin and wherein the amphiphilic material is a poly(ethylene oxide)-poly(propylene oxide)-poly(ethylene oxide) triblock copolymer.

19. The encapsulated composition coated on a fabric of claim 16 wherein the amphiphilic material is a graft copolymer, a modified N,N,N',N'-Tetrakis(2-hydroxypropyl)ethylenediamine, a cationic nanoparticle, a diblock copolymer, a triblock copolymer, an ionic surfactant, a nonionic surfactant, a low surface energy silica, a Guerbet ester, or a poly(steatyl methacrylate-co-acrylic acid).

20. The encapsulated composition coated on a fabric of claim 16 wherein the pyrethroid is transfluthrin encapsulated in a PEO-PPO-PEO block.

* * * * *